(No Model.) 5 Sheets—Sheet 2.

C. W. WEISS.
MOTOR DRIVEN CASH REGISTER AND CHECK PRINTER.

No. 512,641. Patented Jan. 9, 1894.

Fig. 2.

Attest:
A. N. Jesbera.
A. Hidden.

Inventor:
Carl W. Weiss
by William B. Greeley
Atty.

(No Model.) 5 Sheets—Sheet 3.
C. W. WEISS.
MOTOR DRIVEN CASH REGISTER AND CHECK PRINTER.
No. 512,641. Patented Jan. 9, 1894.

(No Model.)   5 Sheets—Sheet 4.

C. W. WEISS.
MOTOR DRIVEN CASH REGISTER AND CHECK PRINTER.

No. 512,641. Patented Jan. 9, 1894.

Attest:
A. N. Jesbera
A. Hidden

Inventor:
Carl W. Weiss
by William B. Greeley
Att'y.

(No Model.) 5 Sheets—Sheet 5.
C. W. WEISS.
MOTOR DRIVEN CASH REGISTER AND CHECK PRINTER.
No. 512,641. Patented Jan. 9, 1894.

Inventor:
Carl W. Weiss
by William B. Greeley
Att'y.

UNITED STATES PATENT OFFICE.

CARL W. WEISS, OF NEW YORK, N. Y.

MOTOR-DRIVEN CASH-REGISTER AND CHECK-PRINTER.

SPECIFICATION forming part of Letters Patent No. 512,641, dated January 9, 1894.

Application filed April 19, 1893. Serial No. 471,001. (No model.)

*To all whom it may concern:*

Be it known that I, CARL W. WEISS, of New York, in the county and State of New York, have invented certain new and useful Improvements in Registers; and I do hereby declare that the following is a full and exact description of the invention, reference being had to the accompanying drawings, and to the letters and figures of reference marked thereon, making a part of this specification.

In the form illustrated in the drawings my present invention relates to machines such as that shown and described in my prior pending application, Serial No. 416,551, filed December 30, 1891, (renewed May 17, 1893, Serial No. 474,562,) and consists in certain improvements by which the construction of such machines is simplified and their mode of operation improved. In its broader scope, however, my present invention is not restricted to machines of the character shown in said prior application. In that machine there was employed an oscillatory type wheel or carrier adapted to be set at each operation of the machine to bring its desired number to the printing point and to be then reset to zero or initial position, and in all machines of this general character with which I am familiar the type-carriers have had this same mode of operation; that is to say, they have oscillated back and forth at each operation of the machine, being turned first forward from initial position to the desired number to be printed, and then, after the printing has been effected, being turned backward to initial position again. In my present machine the type-wheel rotates in one direction only and is not necessarily set at zero or initial position at any operation of the machine. It is under the control of the keys and whenever any key is operated it moves until the number corresponding to the value of such key is brought to the printing point and remains in such position until the next operation of the machine, whereupon it moves forward until the number corresponding to the newly operated key is brought to the printing point; and so on *ad infinitum*.

So far as I am aware I am the first in the art to employ a type-carrier having this mode of operation in a machine of this kind; that is to say, in a machine containing a series of keys representing different values and a type-carrier co-operating with such keys to print their respective values upon a paper strip or ticket, and herein consists one of the features of novelty of my present invention.

In nearly all of the machines of this general character with which I am familiar the indicator, like the type-wheel, has been an oscillatory one, being moved in one direction during the first half of the operation of the machine, (generally backward from the previous indication to initial position,) and in the reverse direction during the second half of the operation of the machine, (from initial position to the new indication;) and in the few instances in which a rotary indicator moving in one direction only has been employed said indicator has been actuated by a motor or operating handle independent of and not under the control of the keys of the machine, the mode of operation consisting in setting the proper key or keys and then operating the handle or releasing the motor by an independent movement, to cause the indicator to be moved to proper position to indicate the value of the operated key or keys.

In my present machine there is employed a numbered wheel, which under the particular construction illustrated serves as a printing wheel but could serve as well as an indicator wheel, which wheel has a rotary movement in one direction only and is actuated by a motor under the control of the operating keys, so that in order to indicate a given amount it is only necessary to operate the key representing such amount, whereupon the numbered wheel will be turned until the number representing such amount is brought to the indicating point.

Another feature of my invention therefore consists in the combination of a rotary wheel bearing a series of numbers and moving in one direction only, with a motor and a series of operating keys controlling the motor and determining the extent of movement imparted by it to said wheel.

A further feature of my invention, in this connection, relates to the combination of such an indicating mechanism with a registering mechanism having an independent connection with the motor and so actuated at each operation of the machine as to register the amount indicated by the number upon the numbered wheel which is brought to the indicating point.

Having thus explained the general character of my invention I will proceed to describe in detail the particular embodiment of it which has been illustrated.

In the accompanying drawings.

Figure 1:
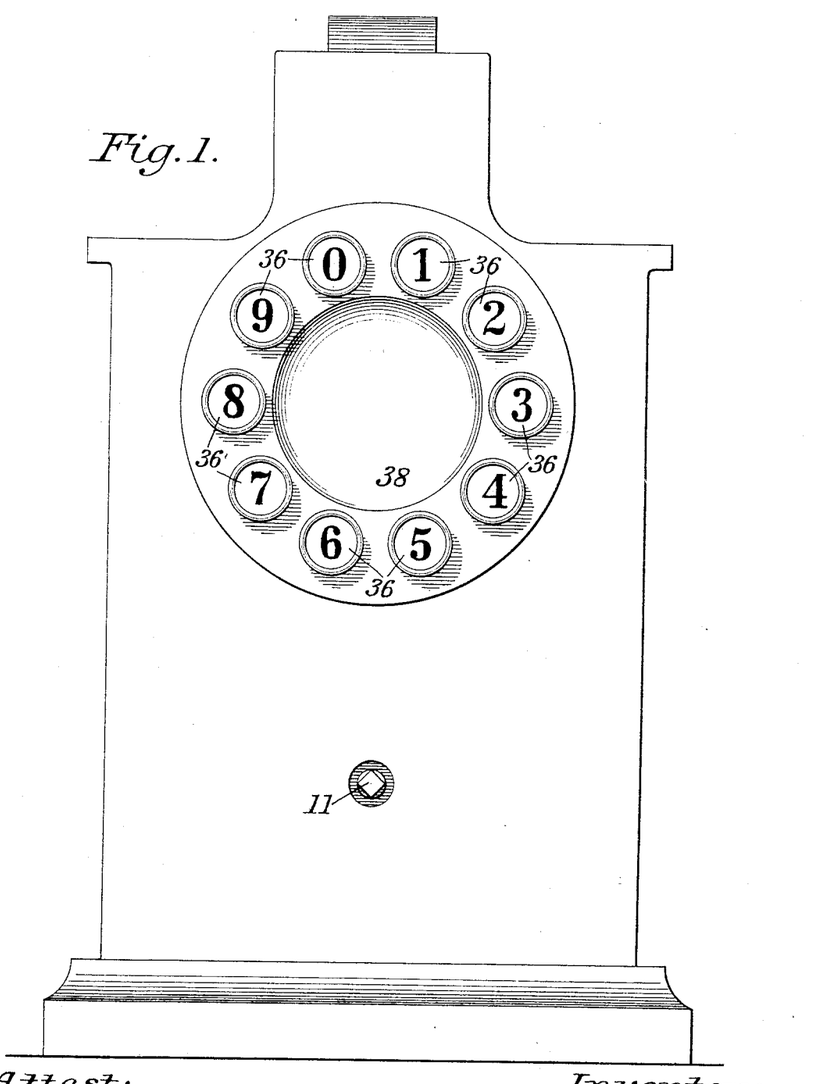
Figure 1 is a front elevation of the improved register.
Figure 2:
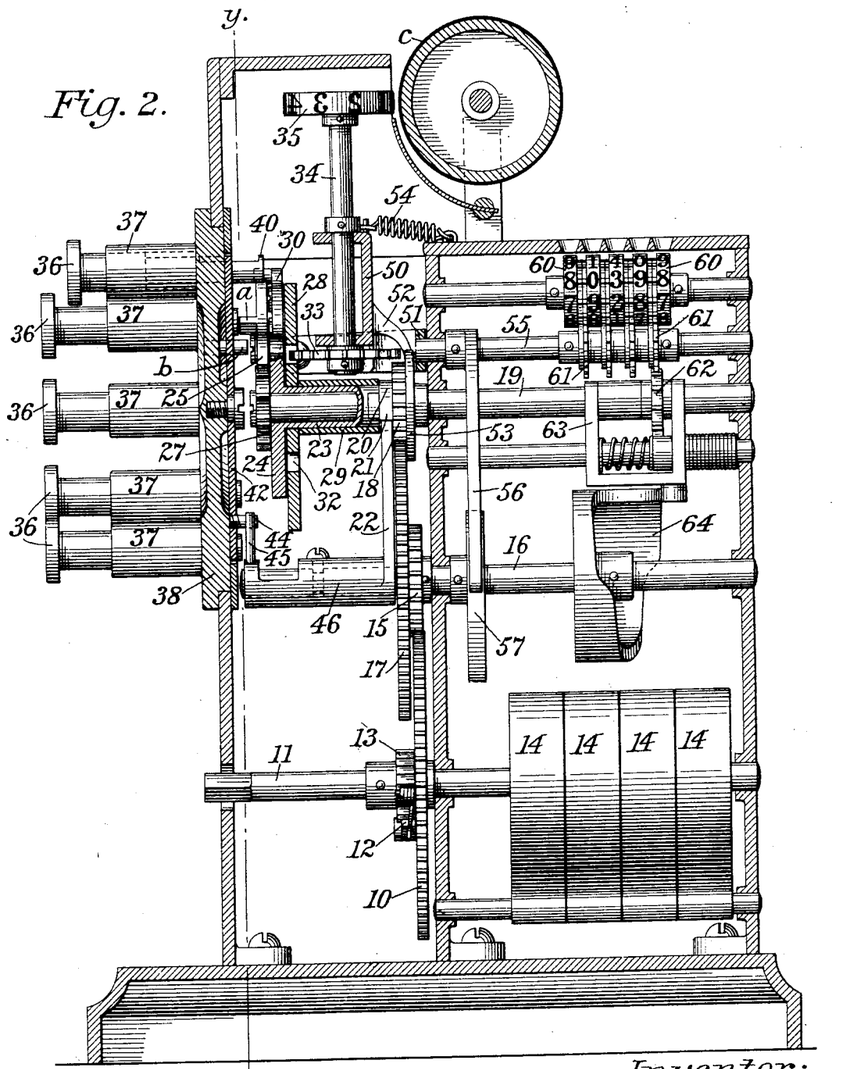
Fig. 2 is a vertical central section of the same on the line $x$—$x$ of Fig. 3.
Figure 3:
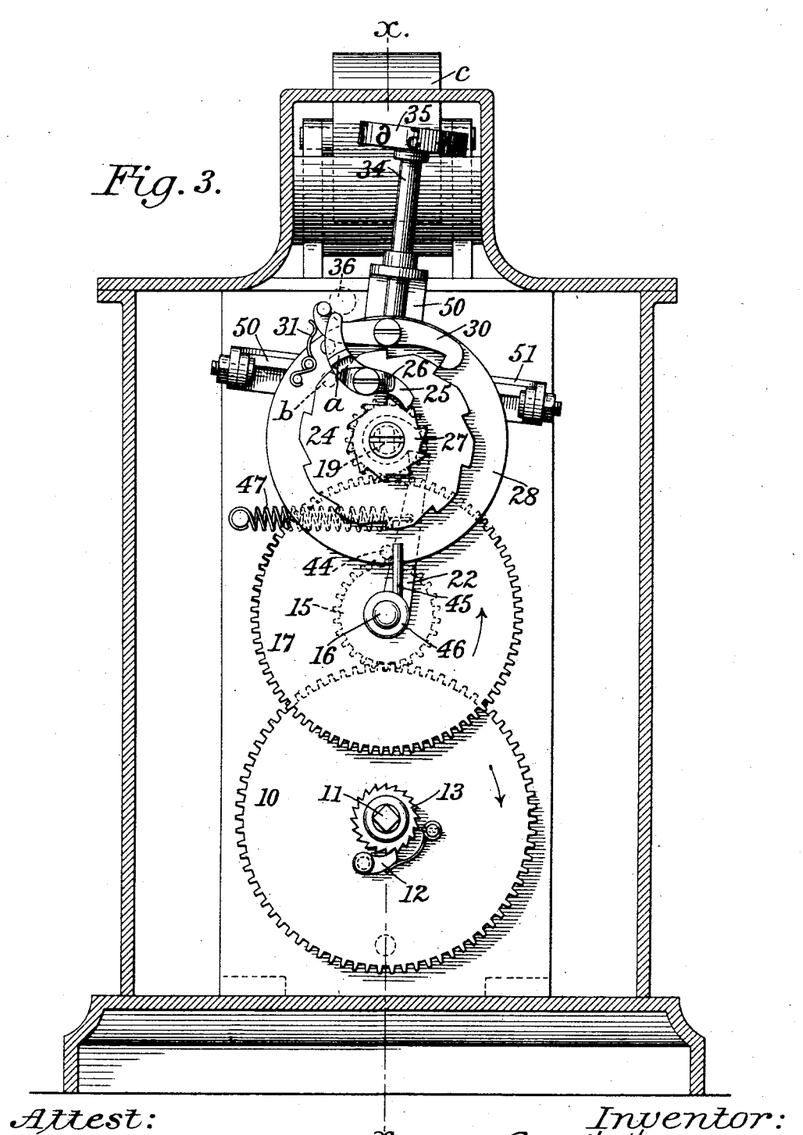
Fig. 3 is a vertical section on the line $y$—$y$ of Fig. 2.
Figure 4:
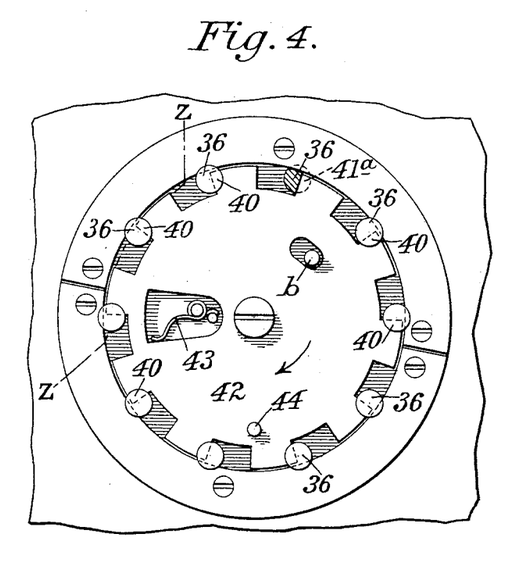
Fig. 4 is a rear view of the locking-plate for the keys.
Figure 5:
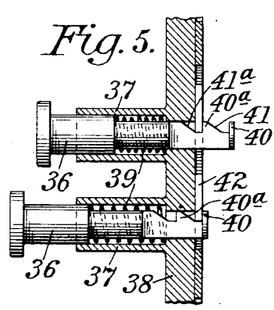
Figs. 5, 6 and 7 are detailed views in section, on the line $z$—$z$ of Fig. 4, illustrating the movement of the keys.
Figure 6:
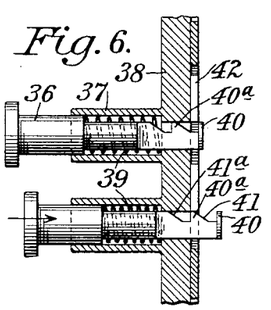
Figure 7:
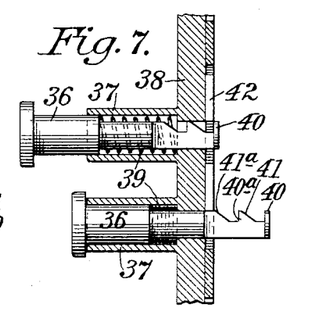
Figure 8:
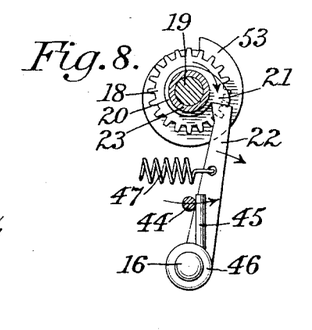
Fig. 8 is a detailed view, in vertical section, illustrating more clearly the escapement or releasing device.
Figure 9:
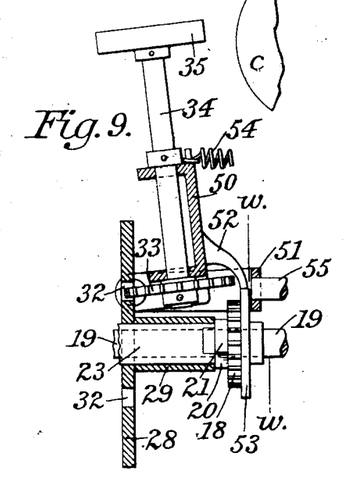
Fig. 9 is a detailed view, in section on the plane of Fig. 2, of a portion of the devices for actuating the figure-wheel.
Figure 10:
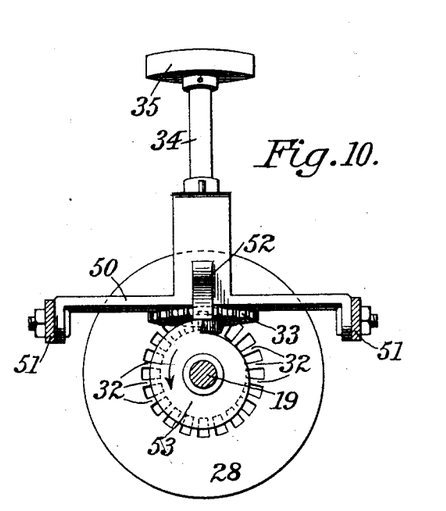
Fig. 10 is a rear elevation of the part shown in Fig. 9, partly in section on the line $w$—$w$ of said figure.
Figures 11, 12:
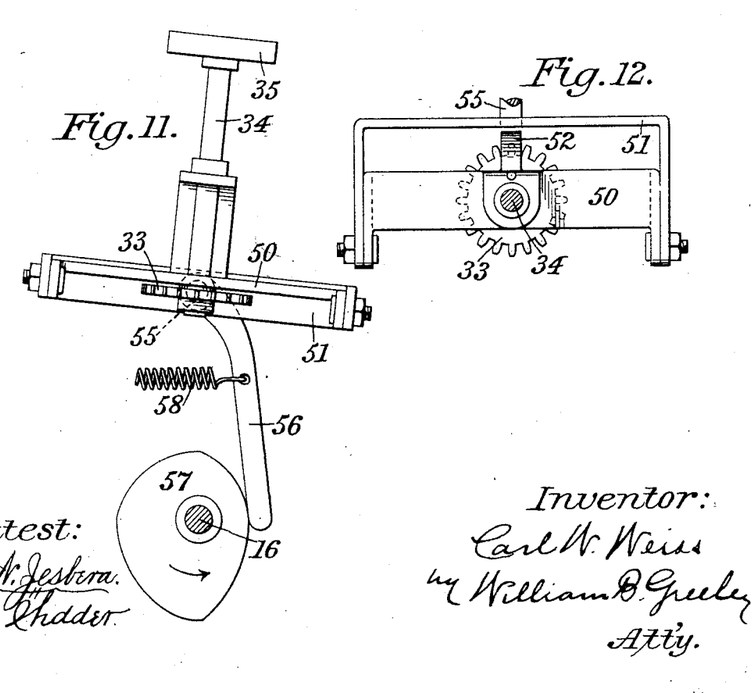
Fig. 11 is a detailed view in front elevation, of means for shifting the figure-wheel laterally.
Fig. 12 is a detailed view, in horizontal section, of the means for supporting the figure-wheel.

The main driving wheel 10 of the register may be driven, always in one direction, Fig. 3, by any suitable motor. As shown in the drawings, it is mounted loosely upon a winding arbor 11 and carries a spring-pressed pawl 12 to engage a winding ratchet 13 which is fixed upon the shaft. One or more coiled springs 14 may be applied to the shaft to drive the same, or any other suitable means may be employed. The wheel 10 meshes with a pinion 15 which is fixed upon a shaft 16 and may be considered as the main actuator for the register, regardless of the particular construction of the motor. Fixed to the pinion 15 is a gear 17 which meshes with and drives a pinion 18 which is mounted loosely upon its shaft 19. The relation between the gear 17 and the pinion 18 is such that for every rotation of the former the latter is rotated as many times as there are places of notation in the greatest number which the register is capable of registering, which in the register shown is four. Fixed to the pinion 18 is a disk 20, see Figs. 2, 8 and 9, having a single tooth 21, which is normally engaged by a detent 22 to hold the mechanism from movement, the detent being thrown out of the path of the tooth and the mechanism released by every operation of any one of the controlling keys hereinafter more particularly referred to. A sleeve 23 is mounted loosely on the shaft 19 and is connected to the disk 20 and pinion 18 to rotate therewith. The forward end of the sleeve 23 bears a ten-toothed wheel 24 upon which is pivoted a dog or latch 25, a friction-plate 26, see Fig. 3, being applied to the latch to hold it in whatever position it may be placed. The latch 25 is adapted to engage and to be disengaged from a ten-toothed wheel 27 fixed to the shaft 19 at different points about the axis of the latter at the will of the operator and therefore constitutes a detachable connection between the driver, which, as shown, is composed of the pinion, sleeve and wheel 24, and said shaft. The tail of the latch is extended outwardly so that in its revolution about the axis it may strike the inner end of one or another of the keys hereinafter referred to and thereby effect the disengagement of the toe of the latch from the wheel 27. The tail of the latch also bears a projection $a$, which, as the wheel 24 returns to its normal position of rest, strikes a fixed pin $b$ and thereby throws the toe of the latch again into engagement with the wheel 27. Journaled loosely upon the sleeve 23, in the rear of the wheel 24, is a disk 28, a spacing sleeve 29 being shown in the drawings as adapted to hold the disk in its position. A dog or latch 30 is pivoted upon the front face of the disk and is pressed by a spring 31 so that it shall normally engage the toothed wheel 24 and serve to transmit movement from said wheel to the disk. The disk is also geared to the indicator or type wheel, as hereinafter more fully described, and the latch 30 therefore constitutes a detachable connection between the driver 18 and said wheel and is capable of being engaged to or disengaged from the driver, by means under the control of the operator, to determine the extent of movement of the number-wheel to bring one figure or another to the indicating point or line of print. To effect the proper movement of the latch 30 at the desired time the tail of the latch is extended so that in its revolution about the axis of the disk 28 it may strike the inner end of one or another of the controlling keys. For the purpose of transmitting the movement of the disk 28 to the numbered wheel the disk may be formed with a series of gear teeth 32, see Figs. 2, 9 and 10, which may be engaged by the teeth of a gear 33. The latter is fixed upon the short shaft 34 which carries at its upper end the numbered wheel 35 above referred to. In the present instance this wheel, as before stated, is a type-wheel and is adapted to be turned to bring its different numbers to the printing point and to co-operate with a suitable platen to print their values upon a paper strip or ticket. It will be readily understood, however, that the wheel could as well serve as an indicator, being turned to different positions to bring its different numbers to the indicating point in the same manner that it is turned to bring its numbers to the printing point. As a type-wheel it has in the present instance other movements than its rotary one, incidental to its printing operations, but as an indicator it need have only a rotary movement to bring its different numbers to a given point where they could be singly exposed to view.

The further description of this wheel and its mode of operation will be confined to its employment as a type-wheel, since the method in which it may be employed as an indicator wheel will be readily understood from what has been said above. A platen c of cylindrical or other suitable shape is in this instance fixed in proximity to the wheel to support a check or tape to receive an impression or imprint from the characters formed on the periphery of the wheel.

The devices for controlling the detachable connections between the driver on the one hand and the shaft 19 on the other may be substantially such as are shown and described in the application for Letters Patent, Serial No. 416,551, above referred to, with some slight modifications. As represented in the drawings, see particularly Figs. 1, 2, 4, 5, 6 and 7, ten keys 36, bearing the figures from 0 to 9, inclusive, are arranged in a circle which is concentric with the shaft 19. Each key 36 is guided in a boss 37, which projects from the plate 38, and is normally pressed outward by a spring 39. The inner end of each key is formed with two teeth 40, 40$^a$, for engagement by the locking plate 42, and with two inclines 41, 41$^a$, for action upon the locking plate for a purpose to be described. The locking plate 42, as usual, is pivoted concentrically with the plate 38 and has formed in its edge a series of notches which correspond with the keys 36, the plate being normally pressed in one direction by a spring 43, so that when any key is pressed and the plate is moved by the incline 41 of the key it may immediately spring back to engage the tooth 40$^a$ and so lock the key until it is released by the operation of another key. The movement of the locking plate by the operation of a key is intended to effect the release of the driver from the detent 22. For this purpose a pin 44 is fixed to the plate in such position that when the plate is shifted by the movement of any key the pin 44 strikes a pin 45 which projects from the hub 46 of the detent 22 and so shifts the latter to release the toothed disk 20. Under the influence of the spring 47 the detent immediately resumes its normal position and is again engaged by the tooth 21 of the disk 20 to stop the driver as soon as it has completed a single rotation unless the locking plate 42 is held against the stress of the spring 43 and the pin 44 is thereby caused to hold the detent back against the stress of the spring 47. Under certain conditions it is desirable to allow the driver to make more than one rotation and it is for this purpose that each key 36 is provided with a second incline 41$^a$ for, as will be understood readily, if the operator presses the key in as far as possible and holds it in, instead of releasing it at once as he would ordinarily do, the locking plate 42 will thereby be held against the stress of the spring 43 and the detent will be held from the path of the tooth 21, allowing the driver to rotate while the key is held in by the operator. It is clear that as soon as the key is released by the operator it moves out sufficiently to permit the locking plate to yield to its spring and engage the tooth 40$^a$, and thereby to hold the key in until the plate is moved again by the operation of another key.

Having now described the means for effecting the rotation of the type-carrier to the necessary extent to bring the desired character thereon to the proper line, it remains to explain the devices for effecting its lateral movement to position to print the several denominations and for producing the impression upon the paper strip or ticket interposed between the carrier and platen c. The shaft 34 to which is fixed the type-carrier 35 has its bearings in a frame 50 which is pivoted to swing in a yoke 51, the axis of the frame being parallel with the plane of print. A toe or projection 52 of the frame 50 rests upon the periphery of a cam 53 which is fixed to the pinion 18 to rotate therewith, a spring 54 being connected to the frame to press the toe upon the cam. The drop of the cam is so located that just before the completion of each rotation of the pinion 18, the spring 54 is free to swing the frame 50 and the type-carrier toward the paper strip or ticket to produce thereon an impression of the type character which has been brought to the line of print. The teeth of the gear 33 and the teeth 32 of the disk 28 are so formed as to permit the necessary movement of the gear 33 with its shaft 34. The yoke 51 is carried by a shaft 55 which is free to rock in bearings in the frame of the register, the axis of the shaft being at a right angle with the axis of the frame 50 and substantially in line with the gear 33 so that the oscillation of the yoke, (its amplitude being slight) and the consequent oscillation of the frame 50, shaft 34 and gear 33 shall not interfere with the driving of the gear 33 by the teeth 32 of the disk 28. An arm 56 is fixed to the shaft 55 and rests upon the periphery of a cam 57 which is secured to the shaft 16, a spring 58 holding the arm in contact with the cam. Since the shaft 16, as before stated, rotates only once while the pinion 18 rotates as many times as there are places of notation within the capacity of the register, the periphery of the cam 57 is divided into as many steps or parts as there are of such places of notation. In the register shown the cam 57 has therefore four parts or steps. When the mechanism is in its normal position of rest the arm 56 bears upon the lowest part of the cam 57 and the type-carrier therefore stands in the extreme right hand or units position. As the shaft 16 makes a quarter rotation at the next operation of the register the highest part of the cam acts upon the arm 56 and throws the type-carrier to the extreme left in position to register thousands. In the successive operations the type-carrier is brought successively to the hundreds, tens and units positions.

The adding mechanism which is shown in Fig. 2 is substantially the same as that shown and described in my said application for Letters Patent, Serial No. 416,551, and need not be described in detail herein. It comprises, in brief, a train of adding wheels 60, a series of driving gears 61, a single actuating gear 62 which is splined to the shaft 19 to rotate therewith and yet to be movable longitudinally thereon to engage the gears 61 in succession, a yoke 63 which embraces said gear 62 and a four-part cam 64 which is fixed to the shaft 16. The rotation of the cam 64 shifts the actuating gear 62 so that it engages the gear 61 in succession as the type-carrier 35 is shifted from one denomination to another. The rotation of the gear 62 at each operation of the register corresponds in extent to the value indicated by the key which is operated and advances the adding train to a corresponding extent.

In describing the operation of the register it will be assumed that the parts are standing in the normal position in which they were left at the close of the last registration of a given number. If now any key be pressed in and released immediately the driver (that is, the pinion 18, sleeve 23 and wheel 24) will be released and make a single rotation, the type-carrier 35 being at the same time shifted to the thousands position and the actuating gear 62 being shifted to engage with the driving gear for the thousands wheel of the adding train. The disk 24 makes a complete rotation with the pinion 18. The operation of the new key will have released the previously operated one, which held the latch 30 out of engagement with the disk 24 and the spring 31 will have thrown it into engagement with it, so that the disk 28 will be coupled to the disk 24 and carried with the latter at the beginning of its movement. The latch 25 being also engaged with the toothed wheel 27 on the shaft 19, (having been so engaged with it at the end of the last operation, as heretofore explained,) the disk 24 in its forward movement will carry both the disk 28 and shaft 19 with it, causing the type-wheel 35 and adding wheel in gear with the shaft 29 to be turned a corresponding distance. The disk 24 will carry the disk 28 and shaft 19 with it until the latches 25 and 30 strike the end of the key which has been pressed in, whereupon the latches will be disengaged from the disks 24 and 27 and the disks 28 and shaft 19 will come to rest, the latch 25 being maintained out of engagement with the disk 24 by its friction plate 26, and the latch 30 being maintained out of engagement with such disk by the engagement of its tail end with the operated key. As the disk 24 completes its revolution the cam $a$ upon the latch 25 will engage the fixed pin $b$ and the latch will be thrown into engagement with the toothed disk 27 again. In this manner the type-wheel 35 is turned until its number corresponding to the operated key is brought to the printing point, and a corresponding amount is added upon the registering wheels by the turning of the shaft 19. At the next operation the disk 24 will carry the disk 28 forward with it until the tail of the latch 30 engages the operated key, whereupon the two disks will be uncoupled and the type-wheel come to rest with its number corresponding to the value of such key at the printing point. If the type-wheel had been set at the previous operation to print 1, and the 9 key should be the one operated at the second operation the type-wheel would be turned eight-tenths of a complete revolution, and its number 9 brought to the printing point, and if the 1 key should be pressed in at the next succeeding operation the type-wheel would be turned on forward two-tenths of a revolution at that operation, to bring its number 1 to the printing point, as will be readily understood. If the same figure is to be repeated in succession, as for instance the non-significant zero when any number having three places of notation or less is to be registered, it is not necessary, as it is in the register constructed as described in my said application, to press in the key corresponding to that figure two or more times in succession, permitting or causing the movement of the mechanism to cease after each time, but it is sufficient to press in the key and hold it in until the figure has been repeated as many times as required. For this reason each key is provided with the second incline 41$^a$ whereby, on pressing in a key as far as possible and holding it in, the locking plate 42 is held over against the stress of the spring 43 and the detent 22 is held out of the path of the tooth 21, permitting the driver to rotate repeatedly. In this case the latch 30 is held out of engagement with the disk 24 by the same key, with the result that the type-carrier 35 is not rotated upon its axis but stands with the same figure at the line of print, while the latch 25 is alternately thrown out of engagement with the toothed wheel 27 by the key and into engagement therewith by the fixed pin $b$ with the result that the successive wheels of the adding train are advanced at each rotation of the driver to an extent corresponding to the value indicated by the key. If it is the zero key which is pressed in the latch 25 is thrown out of engagement with the toothed wheel 27 as soon as the disk 24 commences to move and the actuating gear 62 of the adding mechanism is not rotated at all. Since the devices for shifting the type wheel and causing its movement to produce an impression and the devices for shifting the actuating gear 62 from one driving gear 61 to another, are independent of the connections from the driver 18 to the type-carrier and the adding train they perform their functions at each rotation of the driver.

For the purposes of indicating a single series of figures, as from 0 to 9, the means for shifting the number-wheel in either direction and for shifting the actuating gear of the adding train might be dispensed with and the number wheel be permitted to rotate on a fixed axis.

I claim as my invention—

1. The combination of a rotary type-carrier moving in one direction only, a motor, means for intermittingly connecting the motor and carrier, a series of keys co-operating with such means to disconnect the motor and carrier and thereby determine the extent of movement imparted by the motor to the carrier, and a platen co-operating with the carrier, substantially as described.

2. The combination of a rotary driving member having a uniform movement at each operation of the machine, a rotary driven member turning in one direction only, as a type-wheel or indicator, means for intermittently connecting the driving and driven members, a motor for moving the driving member, means for holding the motor in check, and a series of keys co-operating with the means for holding the motor in check, to release the motor, and with the connecting means between the driving and driven members, to determine the extent of movement imparted to the driven member, substantially as described.

3. The combination of a rotary driving member having a uniform movement at each operation of the machine, a rotary driven member turning in one direction only, a latch for intermittently connecting them, a spring-motor for moving the driving member, a detent for holding the motor in check, and a series of keys co-operating with the detent to release the motor and with the latch to determine the extent of movement imparted to the driven member, substantially as described.

4. The combination of a rotary driving member having a uniform movement at each operation of the machine, a rotary driving member turning in one direction only, a latch for intermittently connecting them, a motor for moving the driving member, means, as a detent, for holding the motor in check, and a series of keys of different values co-operating with the detent to release the motor, and with the latch to disconnect the driving and driven members at different points determined by the operated keys, substantially as described.

5. The combination of a rotary driving member having a uniform movement at each operation of the machine, a rotary type-carrier turning in one direction only, means for intermittently connecting the driving member and type-carrier, a motor for moving the driving member, means for holding the motor in check, a series of keys co-operating with such means to release the motor, and with the connecting means between the driving member and type-carrier to determine the extent of movement imparted by the former to the latter, and a platen co-operating with the type-carrier, substantially as described.

6. The combination of a rotary driving member having a uniform movement at each operation of the machine, a rotary type-carrier turning in one direction only, a latch for intermittently connecting the driving member and type-carrier, a spring-motor for moving the driving member, a detent for holding the motor in check, a series of keys co-operating with the detent to release the motor and with the latch to determine the extent of movement imparted to the type-carrier, and a platen co-operating with the carrier, substantially as described.

7. The combination of a rotary driving member having a uniform movement at each operation of the machine, a rotary type-carrier turning in one direction only, a latch for intermittently connecting the driving member and type-carrier, a motor for moving the driving member, a detent for holding the motor in check, a series of keys of different values co-operating with the detent to release the motor and with the latch to disconnect the driving member and type-carrier at different points determined by the operated keys, and a platen co-operating with the carrier, substantially as described.

8. The combination of a rotary driving-member, a rotary driven member, as an indicator or type-wheel, a latch operating to connect the driving and driven members at or preceding the beginning of movement of the driving member, and a series of keys co-operating with the latch to disconnect the driving and driven members at different points determined by such keys, whereby at each operation of the machine the driven member is carried with the driving member from the beginning of the latter's movement to the point determined by the operated key, substantially as described.

9. The combination of a rotary driving member, a numbered wheel turning in one direction only, a latch operating to connect the driving member and wheel at or preceding the beginning of movement of the driving member, and a series of keys representing amounts corresponding to the numbers upon the wheel and co-operating with the latch to disconnect the driving member and wheel at different points, whereby at each operation of the machine the numbered wheel is carried with the driving member from the beginning of the latter's movement to the point determined by the operated key, substantially as described.

10. The combination of a rotary driving member, a rotary driven member, as an indicator or type-wheel, turning in one direction only, a spring-pressed latch carried by the driven member and operating when unrestrained to automatically engage the driving member and couple the two members together, means for disengaging the latch from the driving member at different points and holding it out of engagement therewith during the further movement of the driving member to initial position, and means for releasing the latch and permitting it to re-engage the driving member after the latter has reached initial position, substantially as described.

11. The combination of a rotary driving member, a rotary driven member turning in one direction only, a spring-pressed latch carried by the driven member and operating when unrestrained to automatically engage the driven member and couple the two members together, and a series of keys any one of which when set is adapted to disengage the latch from the driving member and hold it out of engagement therewith so long as the key remains in its set position, and to release the latch and permit it to automatically reengage the driving member when the key is returned to normal position, substantially as described.

12. The combination of a rotary driving member, a rotary driven member turning in one direction only, a spring-pressed latch carried by the driven member and operating when unrestrained to automatically engage the driving member and couple the two members together, a series of keys any one of which when set is adapted to disengage the latch from the driving member and hold it out of engagement therewith so long as the key remains in its set position, and to release the latch and permit it to automatically re-engage the driving member when the key is returned to normal position, and connections between the keys for releasing a set key and permitting it to return to normal position upon the operation of a second key, substantially as described.

13. The combination of a rotary driving member, a rotary driven member turning in one direction only, a motor for the driving member, means for holding the motor in check, a spring-pressed latch carried by the driven member and operating when unrestrained to automatically engage the driving member and couple the two members together, and a series of keys controlling the means for holding the motor in check and any one of which when set is adapted to disengage the latch from the driving member and hold it out of engagement therewith so long as the key remains in its set position, and to release the latch and permit it to re-engage the driving member when the key is returned to its normal position, substantially as described.

14. The combination of a rotary driving member, a rotary driven member turning in one direction only, a motor for the driving member, means for holding the motor in check, a spring-pressed latch carried by the driven member and operating when unrestrained to automatically engage the driving member and couple the two members together, a series of keys controlling the means for holding the motor in check and any one of which when set is adapted to disengage the latch from the driving member and hold it out of engagement therewith so long as the key remains in its set position, and to release the latch and permit it to re-engage the driving member when the key is returned to its normal position, and connections between the keys whereby the setting of one key releases the previously set key and permits the latch to automatically engage the driving member, substantially as described.

15. The combination of a rotary driving member, a rotary driven member turning in one direction only, a toothed wheel rotating with one member, a latch rotating with the other and adapted to co-operate with the toothed wheel, a spring tending to throw the latch into engagement with the toothed wheel, to couple the driving and driven members together, and a series of operating keys co-operating with the latch to disengage it from the toothed wheel and temporarily maintain it out of engagement therewith against the stress of its spring, substantially as described.

16. The combination of a rotary driving member, a numbered wheel turning in one direction only, a toothed wheel turning with the driving member, a latch turning with the numbered wheel and adapted to co-operate with the toothed wheel, a spring tending to throw the latch into engagement with a toothed wheel, and a series of keys co-operating with the latch to disengage it from the toothed wheel and temporarily maintain it out of engagement therewith, substantially as described.

17. The combination of a rotary driving member, a rotary type-carrier, a toothed wheel turning with the driving member, a latch turning with the type-carrier and adapted to co-operate with the toothed wheel, a spring tending to throw the latch into engagement with the toothed wheel, a series of keys co-operating with the latch to disengage it from the toothed wheel and temporarily maintaining it out of engagement therewith, and a platen co-operating with the type-carrier, substantially as described.

18. The combination of a rotary driving member, as the toothed disk 24, a rotary driven member, as the disk 28, each turning in one direction only a latch 30 pivoted upon the disk 28, a spring 31 tending to press the latch into engagement with the toothed disk 24, a series of keys 36 co-operating with the latch 30 to disengage it from the toothed disk 24 at different points in the movement of the latter and to hold it out of engagement therewith until the set key is released and returned to normal position, and connections between the keys whereby when a given key is set the previously set one is released and the latch 30 permitted to engage the toothed disk 24, substantially as described.

19. The combination of a rotary driving member turning in one direction only, a motor therefor, means for holding the motor in check, a rotary registering member turning in one direction only, a latch carried by the driving member and co-operating with the registering member to couple the two together, means for releasing the motor and disengaging the latch from the registering member at different points in the movement of the driving member, and means for re-engaging the latch with the registering member at the end of the movement of the driving member, substantially as described.

20. The combination of a rotary driving member, a motor therefor, means for holding the motor in check, a rotary registering member turning in one direction only, a latch carried by the driving member and co-operating with the registering member to couple the two together, a series of keys controlling the motor and adapted to disengage the latch from the registering member at different points in the movement of the driving member, and means for re-engaging the latch with the registering member at the end of the movement of the driving member, substantially as described.

21. The combination of a rotary driving member, a motor therefor, a detent for holding the motor in check, a rotary registering member turning in one direction only, a latch carried by the driving member and adapted to be engaged with and disengaged from the registering member, said latch being frictionally held in its different adjusted positions upon the driving member, a series of keys co-operating with the detent to release the motor and to disengage the latch from the registering member at different points in the movement of the driving member, and a fixed stop or cam co-operating with the latch at the end of the movement of the driving member to re-engage it with the registering member, substantially as described.

22. The combination of a rotary driving member, as the disk 24, a rotary driven member, as the ratchet wheel 27, a latch 25 pivoted upon the disk 24 and frictionally held in different positions thereon and adapted to be engaged with the ratchet wheel 27, the keys 36 for disengaging the latch from the wheel 27, and the fixed stop $b$ co-operating with the projection $a$ upon the latch 27 at the end of the movement of the disk 24, substantially as described.

23. The combination of a rotary driving member, a rotary driven member, as an indicator or type-wheel, a latch carried by the driven member for intermittently connecting them, a registering wheel, a second latch carried by the driving member for intermittently connecting the driving member and registering wheel, and a single series of keys co-operating with both latches to disconnect the driving member from the driven member and from the registering wheel at different points determined by the operated keys, substantially as described.

24. The combination of a rotary driving member, a rotary driven member, as an indicator or type-wheel, a latch operating to connect the driving and driven members at the beginning of movement of the driving member, a registering wheel, a second latch operating to connect the driving member and registering wheel when the driving member is turned to initial position, and a single series of keys co-operating with both latches to disconnect the driving member from the driven member and registering wheel, substantially as described.

25. The combination of a rotary driving member, a rotary driven member, as an indicator or type-wheel, turning in one direction only, a latch carried by the driven member and a spring tending to engage it with the driving member, a rotary registering member also turning in one direction only, a second latch, carried by the driving member and adapted to be engaged with and disengaged from the registering member, said latch being frictionally held in its different adjusted positions upon the driving member, a series of keys any one of which when set is adapted to disengage the spring-pressed latch from the driving member and maintain it out of engagement therewith so long as the key remains in set position, and also adapted to disengage the second latch from the registering member, and means for re-engaging said second latch with the registering member at the end of the movement of the driving member, substantially as described.

26. The combination of a rotary driving member, a motor therefor, a detent holding the motor in check, a rotary driven member, as an indicator or type-wheel, a latch carried by the driven member and a spring tending to engage it with the driving member, a rotary registering member also turning in one direction only, a latch carried by the driving member and adapted to be engaged with and disengaged from the registering member, said latch being frictionally held in its different adjusted positions upon the driving member, a series of keys, any one of which when set operates to release the motor and to disengage the spring-pressed latch from the driving member and maintain it out of engagement therewith so long as the key remains in said position, and also to disengage the second latch from the registering member, means for re-engaging such second latch with the registering member at the end of the movement of the driving member, and connections between the keys whereby the setting of a key releases the previously set key and permits the spring-pressed latch to re-engage the driving member, substantially as described.

27. The combination of a rotary driving member, as the toothed disk 24, a rotary driven member, as the disk 28, the latch 30 pivoted upon the disk 28 and the spring 31 tending to engage the latch with the disk 24, the rotary ratchet 27, the latch 25 carried by the disk 24 and adapted to co-operate with the ratchet 27, the keys 36 co-operating with the latches 25 and 30, and the fixed stop $b$ co-operating with the latch 25, substantially as and for the purpose described.

28. The combination with a driving pinion, a toothed wheel carried by said pinion, a disk mounted concentrically with said wheel, a numbered wheel geared to said disk, a latch carried by said disk and adapted to engage the toothed wheel, a second toothed wheel also mounted cencentrically with said first named toothed wheel, an adding train actuated by said wheel, a latch carrried by said first named toothed wheel and adapted to engage the second toothed wheel, and a series of keys adapted to effect the disengagement of said latches at determined points, substantially as shown and described.

29. The combination of a type-wheel, a shaft bearing the same, a gear fixed to said shaft, a frame supporting said shaft, a yoke mounted to oscillate on an axis substantially in line with said gear and having the frame pivoted thereto also substantially in line with said gear, means to oscillate said frame, means to rock said yoke, a toothed disk meshing with said gear, and means to rotate said disk, substantially as shown and described.

30. The combination of an actuating shaft, a gear and a cam fixed on said shaft, a pinion engaged by said gear, a cam carried with said pinion, a yoke oscillated by said first named cam, a frame pivoted in said yoke and rocked by said second named cam, a number-wheel supported by said frame, and means intermediate said pinion and wheel to rotate the latter, substantially as shown and described.

31. The combination of an actuating shaft, a gear and two cams fixed on said shaft, a pinion engaged by said gear, a series of adding wheels, a series of driving gears for said wheels, an actuating gear adapted to be shifted by one of said cams to engage said driving gears in succession, means to rotate said actuating gear from said pinion including a detachable connection, a figure-wheel carried by a yoke which is mounted to oscillate on an axis and is adapted to be oscillated by the other of said cams, means to rotate said figure-wheel from said pinion and also including a detachable connection, and a series of keys adapted to effect the disconnection of said pinion from said number-wheel and said actuating gear at determined points, substantially as shown and described.

32. The combination of a shaft mounted to rotate in bearings, a pinion mounted to rotate on said shaft, an adding train adapted to be driven from said shaft, a toothed wheel fixed to said shaft, a loose disk mounted concentrically with said pinion, a figure-wheel driven by said disk, a toothed wheel carried by said pinion, a latch carried by said last named toothed wheel, a latch carried by said loose disk and adapted to engage said second named toothed wheel, and means to disengage said latches at determined points, substantially as shown and described.

In testimony whereof I have signed my name to this specification in the presence of two subscribing witnesses.

CARL W. WEISS.

Witnesses:
A. N. JESBERA,
A. WIDDER.